United States Patent
Stauffer

(10) Patent No.: US 9,895,836 B2
(45) Date of Patent: Feb. 20, 2018

(54) FUSED FILAMENT FABRICATED PART USING MULTI-DIRECTIONAL LAYERING

(71) Applicant: The Boeing Company, Chicago, IL (US)

(72) Inventor: Matthew S. Stauffer, West Chester, PA (US)

(73) Assignee: The Boeing Company, Chicago, IL (US)

(*) Notice: Subject to any disclaimer, the term of this patent is extended or adjusted under 35 U.S.C. 154(b) by 468 days.

(21) Appl. No.: 14/487,422

(22) Filed: Sep. 16, 2014

(65) Prior Publication Data

US 2016/0075086 A1    Mar. 17, 2016

(51) Int. Cl.

| | |
|---|---|
| *B29C 47/00* | (2006.01) |
| *B32B 5/12* | (2006.01) |
| *B32B 3/28* | (2006.01) |
| *B32B 5/02* | (2006.01) |
| *B32B 5/22* | (2006.01) |
| *B32B 5/26* | (2006.01) |

(Continued)

(52) U.S. Cl.
CPC ........ *B29C 47/0045* (2013.01); *B29C 64/106* (2017.08); *B29C 64/386* (2017.08); *B32B 3/14* (2013.01); *B32B 3/18* (2013.01); *B32B 3/28* (2013.01); *B32B 5/022* (2013.01); *B32B 5/12* (2013.01); *B32B 5/22* (2013.01); *B32B 5/26* (2013.01); *B32B 7/005* (2013.01); *B32B 27/08* (2013.01); *B32B 27/365* (2013.01); *B29L 2031/3076* (2013.01); *B32B 2250/20* (2013.01); *B32B 2262/02* (2013.01); *B32B 2307/50* (2013.01); *B32B 2605/18* (2013.01); *B33Y 10/00* (2014.12); *B33Y 50/02* (2014.12); *B33Y 80/00* (2014.12); *Y02T 50/433* (2013.01)

(58) Field of Classification Search
CPC ............ B29C 67/0085; B29C 67/0088; B29C 67/0055

See application file for complete search history.

(56) References Cited

U.S. PATENT DOCUMENTS

| | | | |
|---|---|---|---|
| 6,114,050 | A | 9/2000 | Westre et al. |
| 2006/0266741 | A1 | 11/2006 | Franchet et al. |

(Continued)

FOREIGN PATENT DOCUMENTS

| | | | |
|---|---|---|---|
| EP | 2 671 707 | | 12/2013 |
| IN | 200801615 I | * | 3/2010 |
| WO | WO 2011/011818 | | 2/2011 |

OTHER PUBLICATIONS

English abstract of IN200801615, Mar. 2010.*
Extended European Search Report dated Jan. 19, 2016 from EP Application Serial No. 15174018.0.

*Primary Examiner* — Christina Johnson
*Assistant Examiner* — Xue Liu
(74) *Attorney, Agent, or Firm* — Miller, Matthias & Hull LLP

(57) ABSTRACT

Technologies for fused filament fabrication using multi-directional layering are disclosed herein. According to aspects of the disclosure, a component may be strengthened using a multi-directional layering manufacturing technique. In some implementations, one or more portions of the component are manufactured in different orientations. In still further implementations, one layer of a component is laid down in a first orientation and a second layer of the component is laid down in a second orientation.

12 Claims, 6 Drawing Sheets

(51) Int. Cl.
  *B32B 7/00*  (2006.01)
  *B32B 27/08*  (2006.01)
  *B32B 27/36*  (2006.01)
  *B32B 3/14*  (2006.01)
  *B32B 3/18*  (2006.01)
  *B29C 64/106*  (2017.01)
  *B29C 64/386*  (2017.01)
  *B29L 31/30*  (2006.01)
  *B33Y 10/00*  (2015.01)
  *B33Y 50/02*  (2015.01)
  *B33Y 80/00*  (2015.01)

(56) References Cited

U.S. PATENT DOCUMENTS

| | | | |
|---|---|---|---|
| 2007/0036964 A1* | 2/2007 | Rosenberger | B29C 67/0055 428/304.4 |
| 2008/0241392 A1* | 10/2008 | Dimter | B22F 3/1055 427/256 |
| 2012/0224755 A1* | 9/2012 | Wu | G06T 17/00 382/131 |
| 2013/0122763 A1 | 5/2013 | Fish et al. | |

* cited by examiner

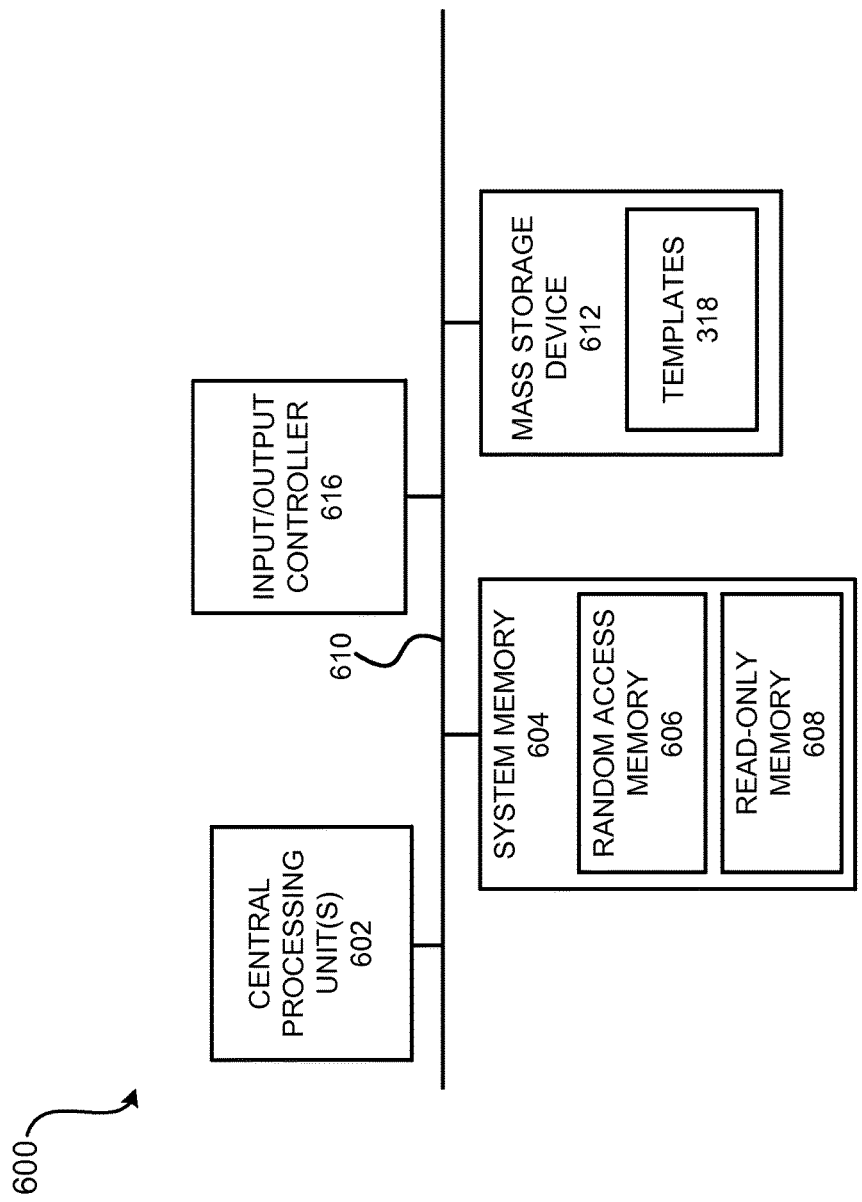

US 9,895,836 B2

FUSED FILAMENT FABRICATED PART USING MULTI-DIRECTIONAL LAYERING

BACKGROUND

Parts and other components of aircraft may be manufactured using various manufacturing techniques depending on the performance requirements of the parts and the availability of manufacturing equipment. A technique that may be used to manufacture components is fused filament fabrication (FFF). FFF is a type of additive manufacture technique whereby material is laid down in layers. A certain number of layers are laid down in a particular arrangement to eventually form a component. FFF commonly uses thermoplastics, polycarbonate, and other similarly configured materials to form the component. FFF can be used to manufacture parts for rapid prototyping as well as rapid manufacturing. Other additive manufacturing technologies may be used in a similar manner.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a component is described. In some examples, the component may include a first layer of parallel abutting extrusions oriented in a first orientation, and a second layer of parallel abutting extrusions deposited on top of the first layer and oriented in a second orientation according to a first offset angle with respect to the first orientation.

According to another embodiment disclosed herein, a method is described herein. In some examples, the method may include receiving a component template comprising instructions to control the operation of a fused filament fabrication (FFF) device, and depositing a first layer of parallel abutting extrusions of material in a first orientation according to the component template. The method may further include depositing a second layer of parallel abutting extrusions of the material in a second orientation according to a first offset angle with respect to the first orientation as provided by the component template.

According to yet another embodiment disclosed herein, a computer-readable storage medium is described. In some examples, the computer-readable storage medium may have instructions stored thereon which, when executed by a processor of a fused filament fabrication system, cause the fused filament fabrication system to deposit a first layer of parallel abutting extrusions of material in a first orientation according to the component template, and deposit a second layer of parallel abutting extrusions of the material in a second orientation according to a first offset angle with respect to the first orientation as provided by a component template.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 6 illustrates a computer in which a multi-directional layering fused filament fabrication process may be implemented according to at least one embodiment disclosed herein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to technologies for fused filament fabrication using multi-directional layering strengthening. In some implementations, various portions of a component may be strengthened using multi-directional layering strengthening. In some examples, a portion of a component needing increased strength is determined. An amount of strengthening desired is calculated. One or more directions of deposition of several layers are determined to achieve the amount of strengthening calculated. Thereafter, the deposition material is deposited in the one or more directions of the several layers.

References are made to the accompanying drawings that form a part hereof, and which are shown by way of illustration, specific embodiments, or examples. Like numerals represent like elements through the several figures.

Figure 1:
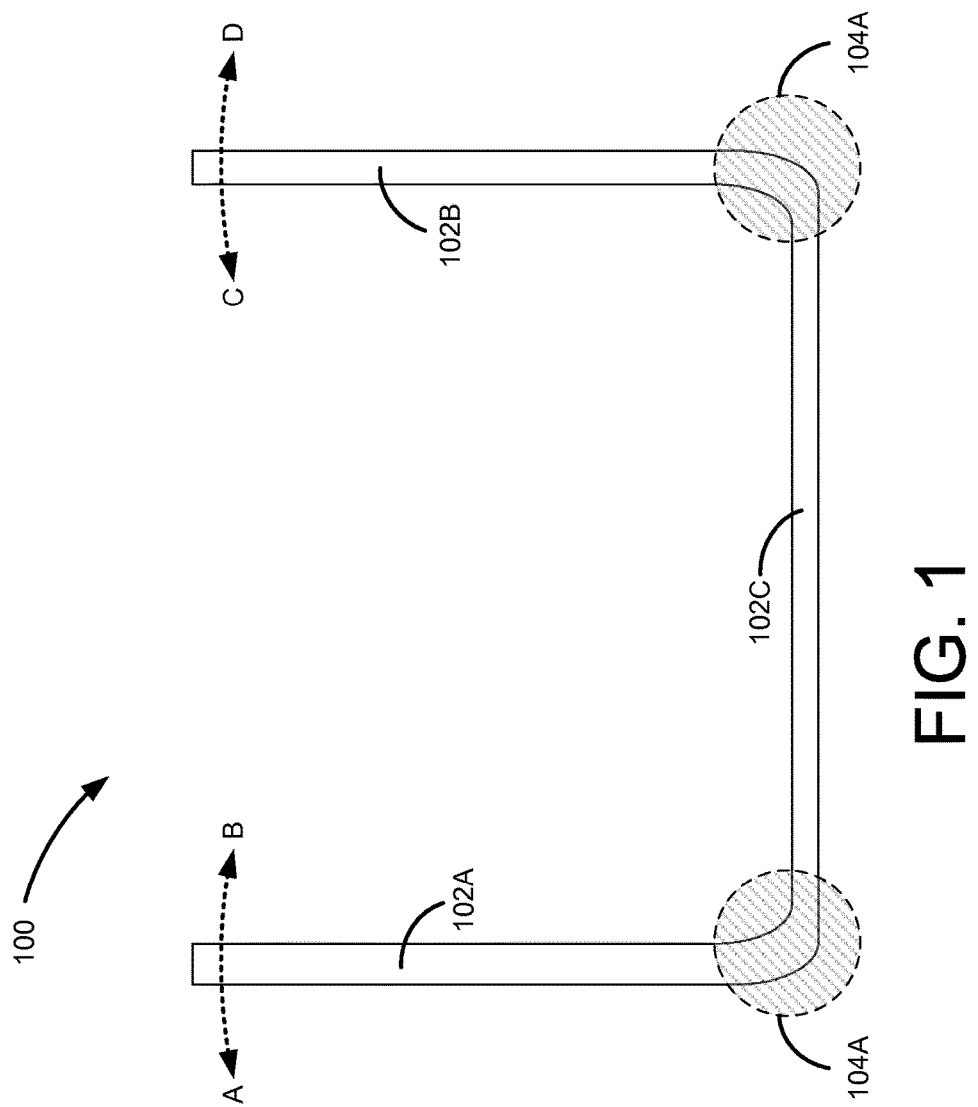
FIG. 1 is a side view diagram of an example of a component having areas possibly prone to failure.

Turning now to the figures, FIG. 1 is a side view diagram of an example of a component 100 having areas that are traditionally prone to failure when manufactured using conventional methods. The component 100 includes a first side 102A, a second side 102B, and a third side 102C. During operation, the component 100 may have placed thereon forces in the direction from A to B or from B to A on the first side 102A and from C to D or from D to C on the second side 102B. These forces may cause a torque to be felt at area 104A or area 104B. Depending on the amount of torque applied to area 104A or 104B, the area 104A or 104B may experience a fail condition. As used herein, a fail condition is a condition whereby a part of the component 100 is structurally weakened to a degree that makes the component 100 unsuitable for use.

Figure 2:
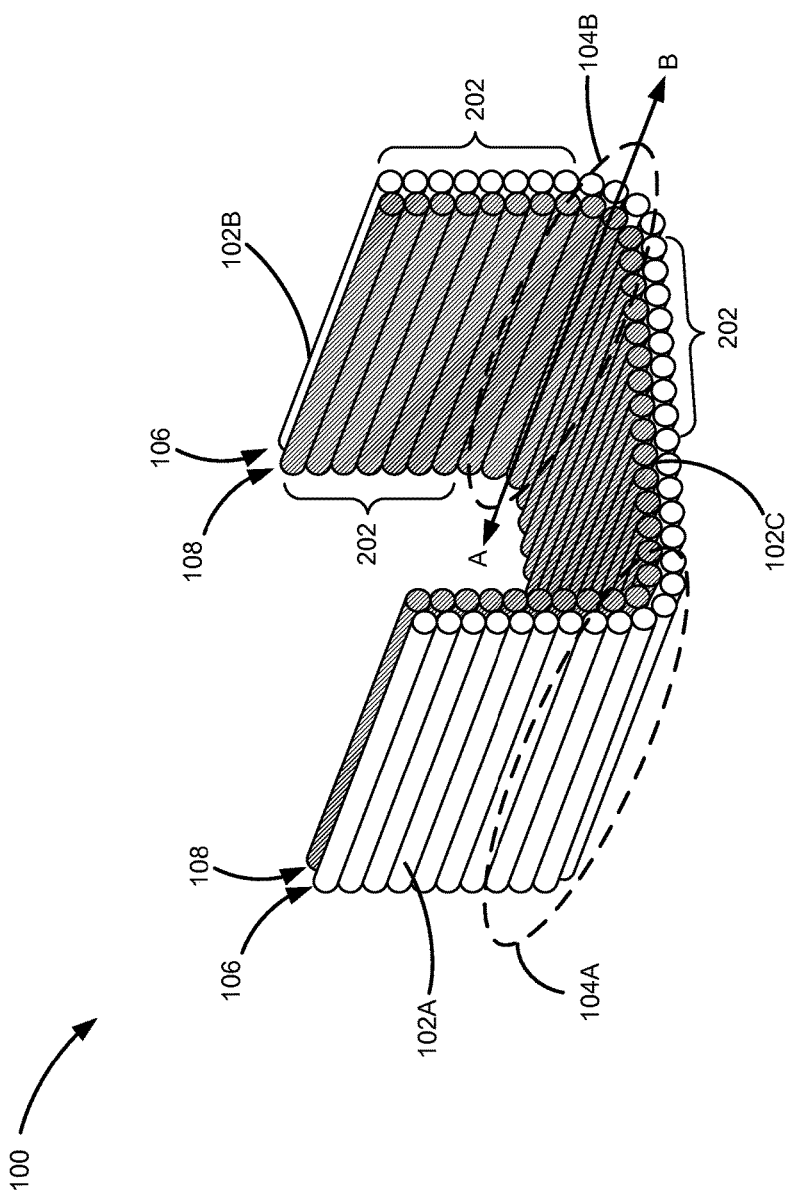
FIG. 2 is a side-perspective view diagram of the component manufactured using prior art FFF techniques according to at least one embodiment disclosed herein.

FIG. 2 is a side-perspective view diagram of the component 100 manufactured using conventional unidirectional layering according to at least one embodiment disclosed herein. Conventional unidirectional layering using FFF techniques includes successive deposition of extrusions 202, with each extrusion 202 expelled from a nozzle (shown in FIG. 3) abutting an adjacent extrusion 202 along a seam. It should be noted that the presently disclosed subject matter is not limited to extruded material, as other manufacturing methods of deposition material may be used and are considered to be within the scope of the presently disclosed subject matter.

One seam of the extrusions 202 is depicted in FIG. 2 as line AB for illustrative purposes. The component 100 is manufactured through the successive deposition of layers of adjacent, parallel extrusions 202 until the component 100 is complete. For example, the component 100 of FIG. 2 is made up of two layers (106 and 108) of extrusions 202 to create the first side 102A, the second side 102B, and the third side 102C, each side having a thickness equivalent to two layers 106,108 of extrusions 202. For clarity purposes, the extrusions 202 making up layer 106 are shown with no fill, while the extrusions 202 making up layer 108 are shown with a pattern.

It should be noted, that the conventional FFF techniques used to create the component 100 result in each layer 106, 108 having extrusions 202 that are all parallel to one another. In doing so, the seams between adjacent extrusions 202 are also parallel to one another, which position the seams within areas 104A and 104B normal to the torque created if a force is applied to the first side 102A and second side 102B, respectively. Because the seams between adjacent extrusions 202 contain the least amount of material within a thickness of a layer, the seams may be the weakest areas in the component 100, particularly when subjected to torsional forces that may rotate adjacent extrusions 202 around the seams.

Figure 3:
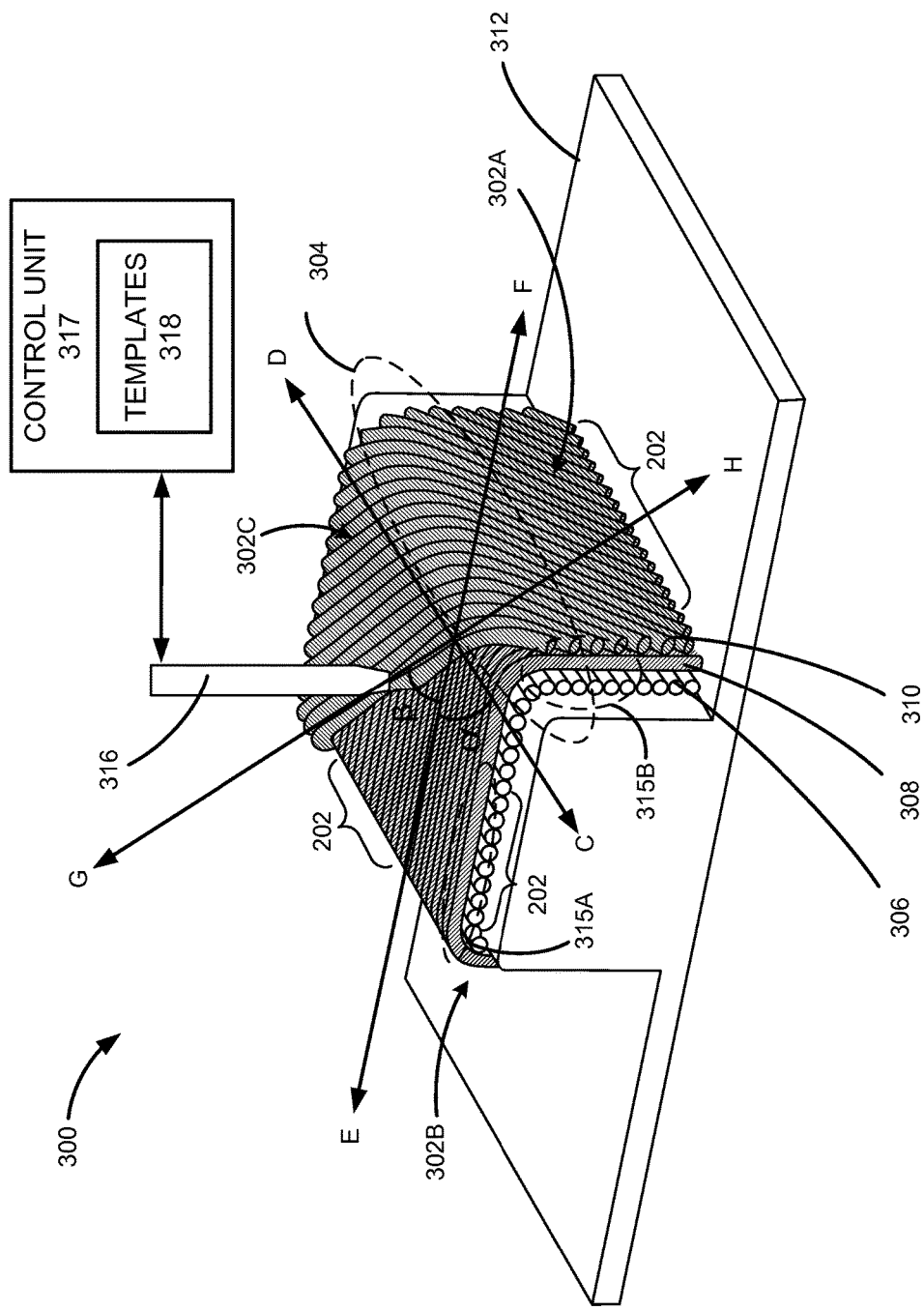
FIG. 3 is a side-perspective view diagram of a component manufactured using multi-directional layering strengthening according to at least one embodiment disclosed herein.

FIG. 3 is a side-perspective view diagram of a component 300 manufactured using multi-directional layering strengthening according to at least one embodiment disclosed herein. In some examples, the component 300 may be a component used in an aircraft. It should be noted, however, that the presently disclosed subject matter is not limited to any particular application.

In FIG. 3, the component 300 is illustrated in an incomplete manufacturing condition, i.e. not all layers have been laid down. The component 300 is formed using a mandrel 312. The mandrel 312 has a size and shape that facilitates the formation of a desired shape for the component 300. The mandrel 312 may act as a build support or template for creating one or more copies of the component 300.

In some implementations, the use of the mandrel 312 may facilitate the formation of a component similar to the shape illustrated in FIG. 1. It should be noted that the presently disclosed subject matter is not limited to any particular shape of the mandrel 312, as other forms may be used to manufacture other shapes and sizes of components. Similarly, the component 300 may be formed from various materials suitable for FFF technologies. The presently disclosed subject matter is not limited to any particular type or category of materials.

The component 300 includes a transition area 304 corresponding to the location at which the side 302A transitions to side 302C. A similar area may be found between side 302C and side 302B. In some implementations, the area 304 may be an area prone to failure if subjected to a torque and manufactured using traditional FFF techniques described above with respect to FIG. 2. However, to reduce the probability that area 304 may experience a fail condition under certain loads or forces, one or more portions of the component 300 may be manufactured using multi-directional layering techniques described herein.

In the example illustrated in FIG. 3, the multi-directional layering concepts described herein include laying down extrusions 202 abutting one another in layers, with each layer oriented in a different angular direction with respect to one another. For example, using nozzle 316, material is first deposited in extrusions 202 abutting one another to create layer 306. Layer 306 includes extrusions 202 having seams that are all parallel to line CD. In other words, the extrusions 202 and corresponding seams of abutting extrusions 202 are all parallel to line CD. Layer 308 is then laid down on top of layer 306.

However, instead of laying down layer 308 with extrusions 202 and seams parallel to line CD, as would be done with conventional FFF techniques, the extrusions 202 and seams of layer 308 are deposited parallel to line EF. In some examples, therefore, the layer 306 comprises parallel abutting extrusions 202 oriented in a first direction (or having a first orientation), while the layer 308 comprises parallel abutting extrusions 202 oriented in a second direction (or having a second orientation). The layers 306 and 308 may include a first planar portion 315A and a second planar portion 315B that is not coplanar with the first planar portion 315A. In these examples, there may be an angular transition (e.g. a curve or bend) between the first planar portion 315A and the second planar portion 315B. In some examples, the area of transition, which in FIG. 3 is illustrated by way of example as transition area 304, may be an area of weakness or an area in which faults may be more likely to occur.

In some examples, the velocity of the nozzle 316 may be controlled by a control unit 317. The control unit 317 may include gears, actuators, and other components that control the speed and direction (e.g. velocity) of the nozzle 316. Additionally or alternatively, the control unit 317 may include one or more computing devices having a storage device that stores one or more templates 318 for, among other possibilities, controlling the velocity of the nozzle 316 as well as the amount of material being discharged from the nozzle 316. The one or templates 318 may include computer-readable instructions that control the nozzle 316 to create extrusions 202 oriented in a desired direction within a single layer, as well as to create multiple layers of extrusions 202 with each layer oriented in a desired angular direction according to the desired offset angles between adjacent layers.

For example, according to this multi-directional layering technique, line EF and layer 308 are oriented at an offset angle $\alpha$ with respect to layer 306. In this example, offset angle $\alpha$ is approximately 90 degrees. Layer 310 is then laid down on top of layer 308, but at an offset angle $\beta$ with respect to layer 308. Offset angle $\beta$ in this example may be approximately 45 degrees. It should be appreciated that the precise offset angles are not limited to 90 degrees and 45 degrees. Rather, the offset angles used between successive layers will depend on the specific implementation and the forces applied to the areas of interest (e.g., area 304) in the particular component 100 being manufactured using multi-directional layering techniques. Any number of layers may be successively applied on top of one another at any number of offset angles with respect to a preceding layer. In some examples, the offset angle $\alpha$ may be equivalent to the offset angle $\beta$. In other examples, the offset angle $\alpha$ may be different from the offset angle $\beta$.

In some implementations, the offset angle $\beta$ may be determined using analytical or empirical methods. Some desirable benefits may include, but are not limited to, increased load-carrying capability, a relatively higher strength, a relatively greater stiffness, and a relatively greater durability than components manufactured using some conventional methods. The offset angle $\beta$ may vary depending on the particular application. Some examples include angles from slightly greater than β degrees to 135 degrees, including combinations between layers from slightly greater than 0 degrees, to 45 degrees, 90 degrees and 135 degrees. It should be noted that the presently disclosed subject matter is not limited to any particular range of offset angle β.

The use of multiple directions for laying down material may provide various benefits in some implementations. For example, stresses or torsional forces imparted on the area 304 may be distributed and alleviated. In another example, the multi-directional arrangement may increase the strength of the component 300 at the area 304 because, among other possible reasons, the different directions allow the transfer of forces along the different layers 306-310.

Further, the different directions may better absorb and disperse applied forces in a manner that is improved over unidirectional manufacturing techniques. In still further applications, the use of different directions may alleviate or reduce plying (or separation of the different layers) when a force is applied. In some configurations, the layers 306-310 may be wholly or partially manufactured in different directions, illustrated in more detail in FIG. 4.

Figure 4:
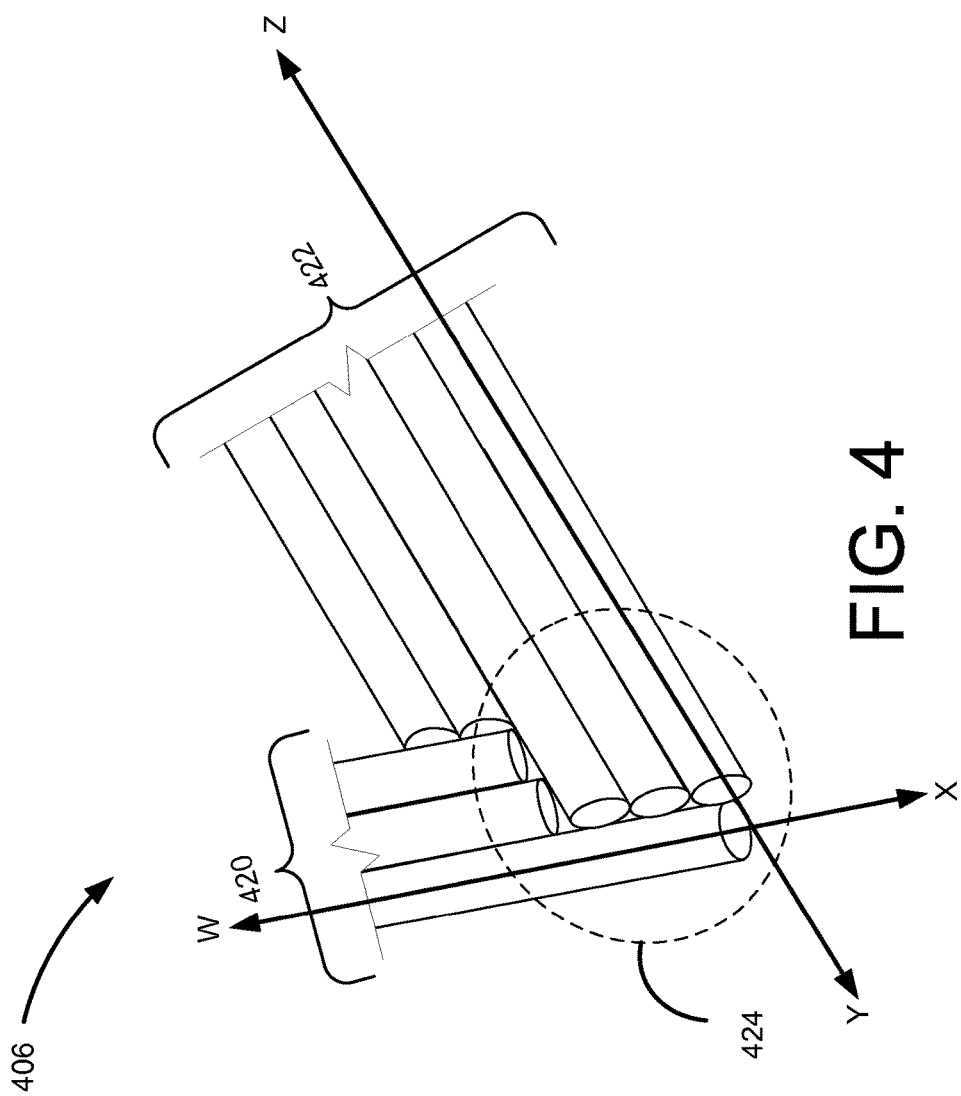
FIG. 4 is a side-perspective view diagram of a partial component manufactured using multi-directional layering strengthening in which a portion of the partial component is laid down in different directions according to at least one embodiment disclosed herein.

FIG. 4 is a side-perspective view diagram of a layer 406 of a component manufactured using multi-directional layering strengthening. The layer 406 is manufactured using extrusions 202 having different directions according to at least one embodiment disclosed herein. In FIG. 4, the layer 406 is formed from first extrusions 420 oriented according to a first direction and second extrusions 422 oriented according to a second direction. The first extrusions 420 and the second extrusions 422 are used to form the layer 406.

The first extrusions 420 and the second extrusions 422 are formed using a multi-directional layering process. The first extrusions 420 are formed in a direction along the line WX. The second extrusions 422 are formed in a direction along the line YZ. An end of the first extrusions 420 and an end of the second extrusions 422 join at junction 424. In some implementations, the multi-directional manufacturing technique used to create junction 424 may change or improve a physical characteristic of the layer 406. For example, the junction 424 may provide an area in which potentially destructive forces are absorbed in a manner similar to an interstitial point defect in a crystalline lattice structure. In this manner, the propagation of a force may be abated at the junction 424, potentially decreasing the occurrence of a fail condition.

Figure 5:
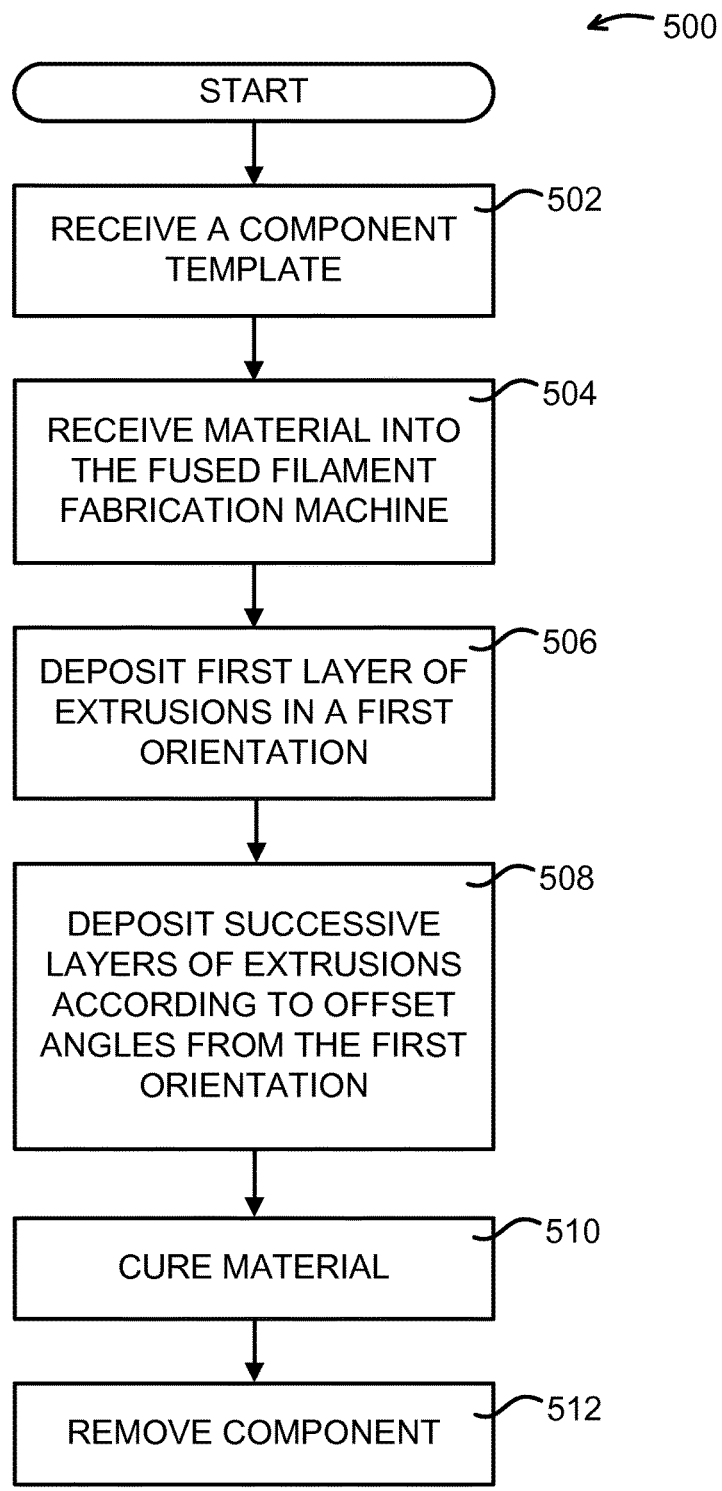
FIG. 5 illustrates one configuration of a routine for manufacturing a component using a multi-directional layering fused filament fabrication process according to at least one embodiment disclosed herein.

FIG. 5 illustrates one configuration of a routine 500 for manufacturing a component using a multi-directional layering fused filament fabrication process according to at least one embodiment disclosed herein. Unless otherwise indicated, more or fewer operations may be performed than shown in the figures and described herein. Additionally, unless otherwise indicated, these operations may also be performed in a different order than those described herein.

The routine 500 commences at operation 502 ("receive a component template"), where a component template is received. In some examples, the component template may include computer-readable instructions that control the operation of a FFF device to create a component using the multi-directional layering techniques disclosed herein. As described above, the FFF device, or more particularly a control unit 317 of the FFF device, executes the component template 318 to control the velocity, quantity, and orientation of material exiting the nozzle 316. Receiving the component template 318 may include loading the template into memory of the FFF device, or retrieving the instructions from memory.

The routine 500 continues to operation 504 ("receive material into the fused filament fabrication device"), wherein material is received into the FFF device. The material may vary depending on the particular application of the presently disclosed subject matter. For example, if the mandrel is not used, the material may have integrated within the material one or more support materials. The support materials may be configured to allow the material to be deposited without the support provided by the mandrel. The material may be one or more composites, plastics, or other material suitable for component manufacture. The support materials may include one or more metallic, plastic, ceramic, or other substances that allow the material to be deposited without the need for a support such as the mandrel 312 of FIG. 3. The presently disclosed subject matter is not limited to any particular type of material.

The routine 500 continues to operation 506 ("deposit first layer of extrusions in a first orientation"), where a first layer of extrusions are deposited in a first orientation. As described by way of example in FIG. 3, the orientations of the various layers of the component 300 may be laid down in different orientations. In operation 506, the first layer is laid down in a first orientation, which may be followed by one or more layers in different orientations, as described immediately below.

The routine 500 continues to operation 508 ("deposit successive layers of extrusions according to offset angles from the first orientation"), where successive layers of extrusions are deposited according to offset angles from the first orientation. As described by way of example in FIG. 3, above, the line EF and layer 308 are oriented at an offset angle α with respect to layer 306. Layer 310 is then laid down on top of layer 306, but an offset angle β with respect to layer 308. As described by way of further example in FIG. 4, a single layer may be comprised of one or more offset angles. As described above, the first extrusions 420 are formed in a direction along the line WX and the second extrusions 422 are formed in a direction along the line YZ.

The routine 500 continues to operation 510 ("cure material"), where the material that forms the component is allowed to cure. It should be noted that the presently disclosed subject matter is not limited to material that requires curing to complete processing, as some material may be finished without a cure cycle.

The routine 500 continues to operation 512 ("remove component"), where the component is removed from the FFF device. The routine 500 may thereafter end.

FIG. 6 illustrates a computer in which fused filament fabrication using multi-direction layering strengthening may be implemented according to at least one embodiment disclosed herein. The computer 600 illustrated in FIG. 6 includes one or more central processing unit(s) ("CPUs") 602, a system memory 604, including a random-access memory ("RAM") 606 and a read-only memory ("ROM") 608, and a system bus 610 that couples the system memory 604 to the CPU 602. A basic input/output system containing the routines that help to transfer information between elements within the computer 600, such as during startup, may be stored in the ROM 608. According to various embodiments, the computer 600 is the control unit 317 described above, or is communicatively coupled to the control unit 317.

The CPUs 602 may be standard programmable processors that perform arithmetic and logical operations for the operation of the computer 600, such as the routine 500 described above. The CPUs 602 may perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 600 may also include a mass storage device 612. The mass storage device may be an optical disk, a magnetic storage device, or a solid state storage device. The mass storage device 612 may be operative to store one or more templates 318 that are configured to control the operation of the control unit 317. In another configuration, the RAM 606, ROM 608, and the mass storage device 612 may be operative to have stored thereon, either alone or in various combinations, the templates 318.

The computer 600 may store programs and data on the mass storage device 612 by transforming the physical state of the mass storage device 612 to reflect the information being stored. The specific transformation of physical state may depend on various factors, in different implementations of this disclosure. Examples of such factors may include, but are not limited to, the technology used to implement the mass storage device 612, whether the mass storage device 612 is characterized as primary or secondary storage, and the like.

For example, the computer 600 may store information to the mass storage device 612 by issuing instructions through a storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer 600 may further read information from the mass storage device 612 by detecting the physical states or characteristics of one or more particular locations within the mass storage device 612.

The RAM 606, the ROM 608, or the mass storage device 612 may be operative as computer-readable storage mediums. Various aspects of the present disclosure may be stored on other types of computer-readable storage mediums, such as, but not limit to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. It should be understood that when the claims are interpreted in light of this present disclosure, a computer-readable storage medium does not include energy in the form of waves or signals.

The computer 600 also may include an input/output controller 616 for receiving and processing input from a number of other devices, including a keyboard, mouse, or electronic stylus. Similarly, the input/output controller 616 may provide an output to a display screen, a printer, or other type of output device. In some implementations, the input/output controller 616 may control the operation of one or more mechanisms that control the velocity of the nozzle 316 as well as the amount of material extruded from the nozzle 316. One or more embodiments may include a computer-readable storage medium manufactured so that, when read by a properly configured computing device, instructions may be provided to a fused filament fabrication system to perform operations relating to fused filament fabrication using multi-direction layering strengthening.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method for constructing a component by fused filament fabrication (FFF), comprising:
   receiving a component template comprising instructions to control the operation of a fused filament fabrication (FFF) device;
   depositing a first layer of parallel abutting extrusions of material according to the component template, the abutting extrusions extending in a first orientation, the first layer comprising one or more second parallel abutting extrusions oriented in a different direction than the first orientation; and
   depositing a second layer of parallel abutting extrusions of the material as provided by the component template, the abutting extrusions of the second layer extending in a second orientation, the second orientation and the first orientation being angularly offset from each other by a first offset angle.

2. The method of claim 1, further comprising curing the material.

3. The method of claim 1, further comprising integrating a support material into the material.

4. The method of claim 1, further comprising depositing a third layer of parallel abutting extrusions of the material, wherein the abutting extrusions of the third layer extend in a third orientation with respect to the second orientation, and wherein the third orientation and the second orientation are angularly offset from each other by a second offset angle.

5. The method of claim 4, wherein the second offset angle is equivalent to the first offset angle.

6. The method of claim 4, wherein the second offset angle is different from the first offset angle.

7. The method of claim 1, wherein depositing a first layer of parallel abutting extrusions of the material in a first orientation or depositing a second layer of extrusions of the material in a second orientation is performed using a mandrel.

8. The method of claim 1, wherein the first layer and the second layer comprise a first planar portion and a second planar portion that is not coplanar with the first planar portion, and wherein the first planar portion and the second planar portion are joined together at a transition area.

9. A computer-readable storage medium having instructions stored thereon which, when executed by a processor of a fused filament fabrication system, cause the fused filament fabrication system to:
   deposit a first layer of parallel abutting extrusions of material in a first orientation according to the component template, the first layer comprising one or more second parallel abutting extrusions oriented in a different direction than the first orientation; and deposit a second layer of parallel abutting extrusions of the material in a second orientation according to a first offset angle with respect to the first orientation as provided by a component template.

10. The computer-readable storage medium of claim 9, further comprising instructions to deposit a third layer of parallel abutting extrusions of the material in a third orientation according to a second offset angle with respect to the second orientation.

11. The computer-readable storage medium of claim 10, wherein the second offset angle is equivalent to the first offset angle.

12. The computer-readable storage medium of claim 10, wherein the second offset angle is different from the first offset angle.

* * * * *